Aug. 25, 1925.  
T. C. VINSON  
1,551,348  
MOTOR VEHICLE DASH LIGHT, STOP, AND DIRECTION SIGNAL  
Filed Sept. 18, 1924  2 Sheets-Sheet 2
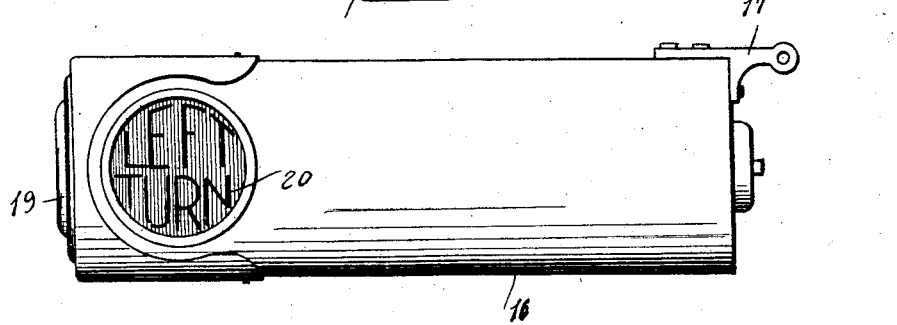
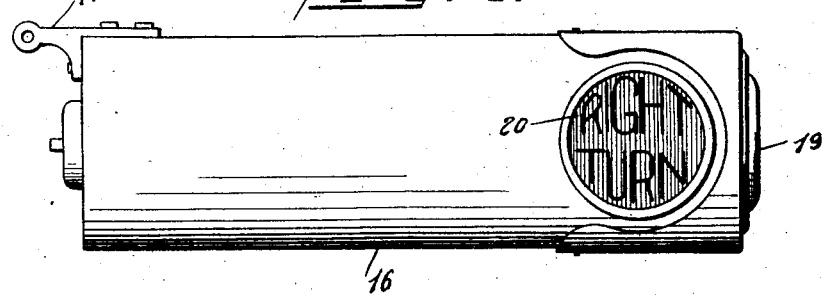
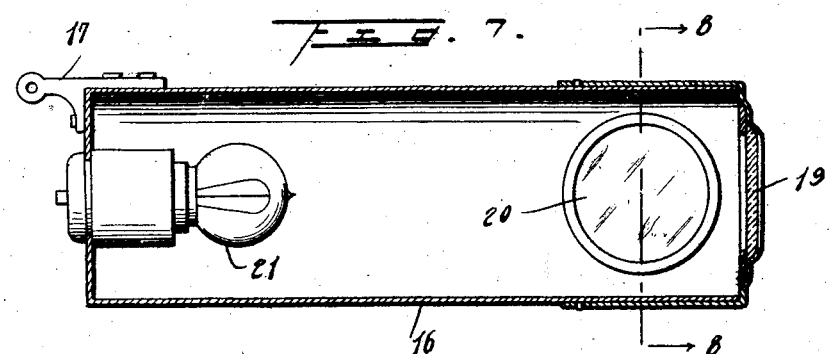
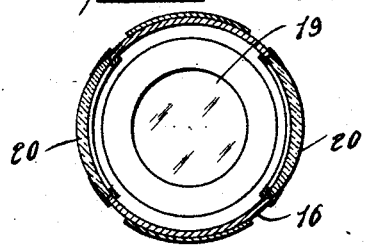
Inventor  
T. C. Vinson, Patented Aug. 25, 1925.

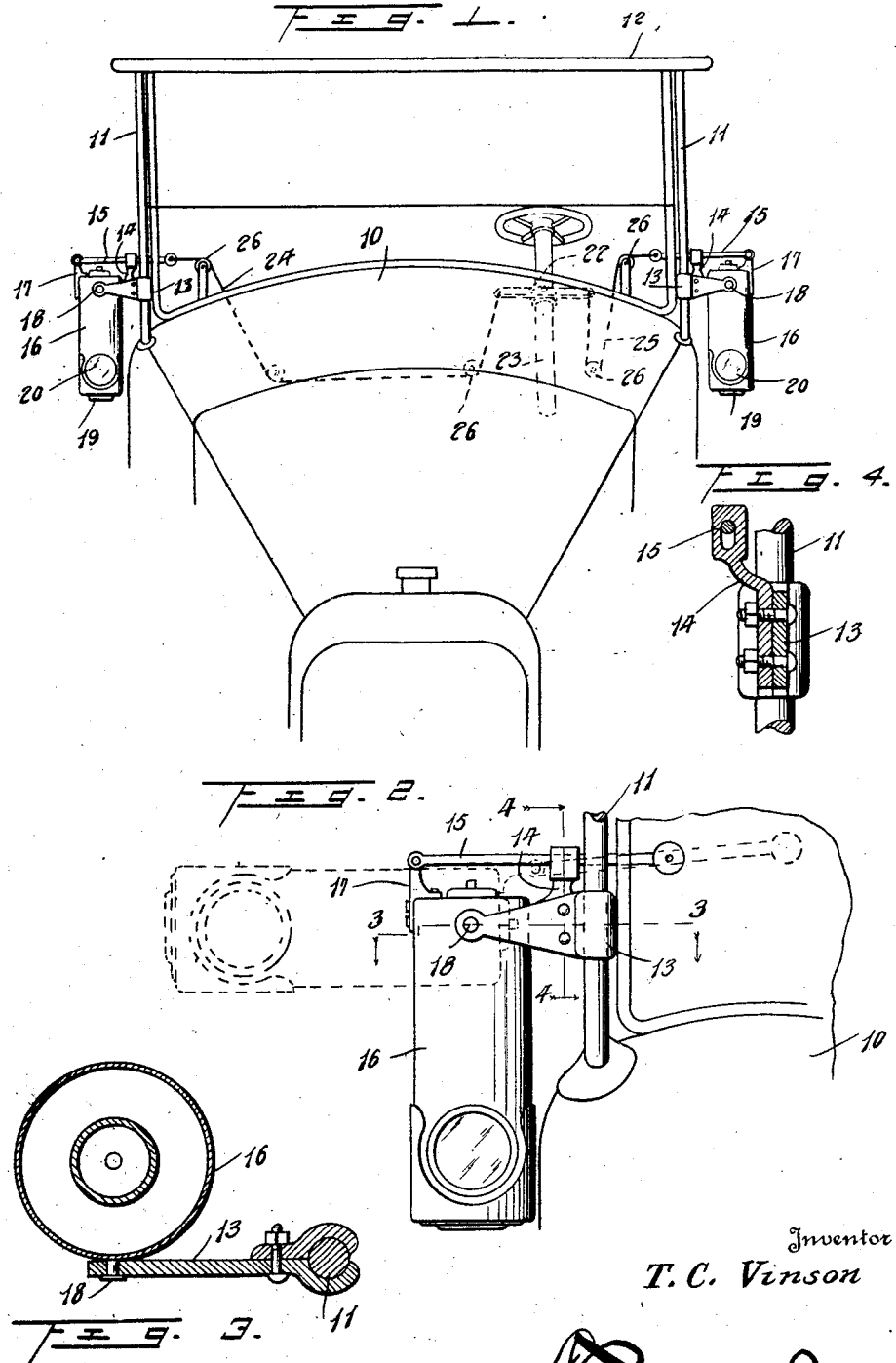

1,551,348

UNITED STATES PATENT OFFICE.

THOMAS C. VINSON, OF GARY, INDIANA.

MOTOR VEHICLE DASH LIGHT, STOP, AND DIRECTION SIGNAL.

Application filed September 18, 1924. Serial No. 738,448.

*To all whom it may concern:*

Be it known that I, THOMAS C. VINSON, a citizen of the United States, residing at Gary, in the county of Lake and State of Indiana, have invented certain new and useful Improvements in Motor Vehicle Dash Lights, Stops, and Direction Signals; and I do hereby declare the following to be a full, clear, and exact description of the invention, such as will enable others skilled in the art to which it appertains to make and use the same.

The invention relates to a signal for automobiles and analogous motor vehicles which is adapted to be applied to the dash and to signal the intention of the driver when about to stop or to turn either to the right or to the left, said signal embodying a few number of parts and of such construction as to be readily applied to any make or type of motor vehicle.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification—

Figure 1 is an elevational view of a motor vehicle provided with signaling means embodying the invention, Figure 2 is a detail view, adjusted position of the signal being shown by full and dotted lines, Figure 3 is a sectional view on the line 3—3 of Figure 2, Figure 4 is a sectional view on the line 4—4 of Figure 2, Figure 5 is a side view of the signal, Figure 6 is a similar view of the reverse side, Figure 7 is a central longitudinal section, and Figure 8 is a sectional view on the line 8—8 of Figure 7.

Corresponding and like parts are referred to in the following description and designated in the several views of the drawings by like reference characters.

The numeral 10 denotes the dash of a motor vehicle, and 11 represents rods extended upwardly therefrom and connected at their upper ends by means of a cross piece 12, the same forming a supporting frame for the windshield.

An arm 13 is clamped to each of the rods 11 and a bracket 14 projects vertically therefrom, and forms a support and guide for a rod 15 which passes through a vertically elongated opening in the upper end thereof. A casing 16 is provided at its inner end with a lug 17 to which the outer end of the rod 15 is pivoted as shown most clearly in Figure 2. The inner end of the casing 16 is pivoted to the arm 13 as indicated at 18 and is provided at its outer end with a terminal and front and rear side openings to which are fitted lenses or glass plates 19 and 20 respectively and which may be colored as required to display red and white lights. The front lenses display a white and the rear lenses a red light to indicate danger, and directional data is associated with the rear lights as shown most clearly in Figures 5 and 6, the one designating a left turn and the other, a right turn so that the driver of the vehicle in the rear may know and be advised of the intention of the driver of the vehicle in front when a turn is about to be made.

These signals are located upon opposite sides of the vehicle as indicated most clearly in Figure 1, the one on the right displaying the words "Right turn" to the rear, and the one on the left displaying the words "Left turn" to the rear and one or the other of the signals is operated according to the direction of turn about to be made, said signals being operated by means of the rod 15 which are operable from within the car as indicated most clearly in Figures 1 and 2.

An electric bulb 21 is disposed within the casing 16 to illuminate the terminal and side openings to render the signal visible. The signals may be conveniently operated by means of connections which, as shown, embody a lever 22 pivoted to the steering column 23, flexible elements 24 and 25 between the ends of the lever 22 and the rods 15 and guide pulleys 26 to give proper direction to the flexible elements 24 and 25. Movement of the lever 22 in one direction actuates one of the signals and movement in the opposite direction actuates the other signal. The lever 22 and coacting connections provide convenient means for operating the signals.

What is claimed is:—

1. A vehicle signal comprising an arm, a bracket on said arm having an elongated opening, a signal casing pivotally mounted on said arm, a rod slidably mounted in said elongated opening and operatively connected with said signal casing, and means to actuate said rod.

2. A vehicle signal comprising an arm, a bracket on said arm having an elongated opening, a signal casing pivotally mounted on said arm, a rod slidably mounted in said elongated opening and operatively connected with said signal casing, an operating lever suitably positioned, and a flexible member connecting said lever with the rod aforesaid.

In testimony whereof I affix my signature.

THOMAS C. VINSON.